United States Patent [19]
Oswald

[11] 3,739,192
[45] June 12, 1973

[54] NON-OSCILLATING ARCLESS SWITCHING OR INDUCTIVE D.C. LOADS

[76] Inventor: Joseph V. Oswald, 2852 South Central Park Avenue, Chicago, Ill. 60623

[22] Filed: Nov. 24, 1971

[21] Appl. No.: 201,633

[52] U.S. Cl. .............................. 307/136, 317/11 R
[51] Int. Cl. .............................................. H01h 9/30
[58] Field of Search ......................... 307/136, 104; 317/11 R, 11 A, 11 B, 11 C, 11 D, 11 E

[56] References Cited
UNITED STATES PATENTS

| | | | |
|---|---|---|---|
| 2,758,254 | 8/1956 | Kramer | 317/11 E |
| 2,094,361 | 9/1937 | Lee | 307/136 X |
| 1,966,077 | 7/1934 | Nyman | 307/136 X |

*Primary Examiner*—Robert K. Schaefer
*Assistant Examiner*—M. Ginsburg

[57] ABSTRACT

A circuit interrupter for arclessly interrupting current flow to an inductive D.C. load, comprising first and second switches which are functionally offset, in opening sequence, by a predetermined switching interval; during the switching interval, a like level of energy of polarity opposite to the energy stored in the magnetic field of the load is transferred to a capacitor connected in parallel with the first switch, whereupon both energy charges are simultaneously discharged into and thermally dissipated in a resistance connected in parallel with the capacitor. The switching interval corresponds to one-fourth cycle of the resonance frequency of the resonant circuit formed by the capacitor and the inductive load plus the RC and L/R time functions of the circuit; the resistance is selected, relative to the capacitor and the load inductance, to preclude oscillation of the load current during the time interval between the opening of the first and second switches. The capacitance is selected relative to the load inductance, to fix and limit the maximum voltages occurring in the course of the switching interval.

7 Claims, 6 Drawing Figures

3,739,192

NON-OSCILLATING ARCLESS SWITCHING OR INDUCTIVE D.C. LOADS

BACKGROUND OF THE INVENTION

In the commutation or interruption of a D.C. power supply circuit, using ordinary switching contacts, there is a substantial tendency toward arcing, particularly when the circuit is opened at voltages of 25 volts or more. If the power supply circuit is opened when a substantial load current is present, the arcing usually leads to pitting and erosion of the switch contacts, materially shortening the life of the switch. This is true even in those instances in which the switch is equipped with arc quenching means, such as a conventional magnetic blow-out device. Arcing presents a substantial problem, particularly in the operation of highly self-inductive electromagnetic devices such as large magnetic contactors, brake coils, magnetic clutches, field windings for D.C. motors and generators, and the like, often leading to rapid pitting and premature failure of the power supply switch, with possible damage to the load device.

It is generally understood in the art that an abrupt interruption of the load current to an electromagnetic device of the kind mentioned above results in a similarly abrupt collapse of the magnetic field of the device. The collapse of the magnetic field generates a voltage of self-induction in the windings of the device. The amplitude of the induced voltage is determined by the rate of collapse of the magnetic field; specifically, the greater the rate of decline of the field flux, the higher the maximum value of the induced voltage appearing at the terminals of the windings of the device. Thus, abrupt termination of the load current to an electromagnetic device of this kind, and the resulting abrupt collapse of its magnetic field, applies a concentrated voltage stress to the terminal insulation of the device and also to the internal insulation of the coils in the device.

It is also recognized that the aforementioned induced voltage and the current developed as a result of the voltage are representative of the energy stored in the magnetic field of the device. On this basis, it has been common practice to provide a resistive discharge path across the terminals of the inductive load so that, upon interruption of the power supply circuit and the ensuing collapse of the magnetic field, the self-induced voltage produces a current flow through a closed circuit comprising the winding of the device and the discharge resistance. In this manner, the energy stored in the magnetic field of the load is dissipated in the combined ohmic resistance of the load winding and the discharge resistor, distributing the induced voltage around the circuit and reducing the concentration of voltage at the winding terminals. Simultaneously, the induced current flowing around the circuit and through the windings of the load device produce inverse ampere-turns which operate to retard the rate of reduction of the magnetic field and thus tend to reduce the overall maximum value of the induced voltage.

The switch interrupting the power supply circuit to an inductive load is subjected to the stress of the induced voltage as well as the voltage from the power supply itself. As a consequence, to the extent that the inhibiting discharge path does not reduce the self-induced voltage to approximately zero, the arc formed at the switch contacts is greater than that attributable to the ohmic resistance of the load alone. Thus, the initial portion of the stored energy from the magnetic field of the load is at least partially dissipated in the heat of the arc and the arc is sustained until the induced voltage subsides to a level at which it can no longer maintain an arc between the switch contacts.

A somewhat different D.C. circuit interrupter, specifically directed to application to high potential D.C. circuits, is shown in Lee U.S. Pat. No. 2,094,361; the circuit illustrated n FIG. 3 of that patent employs two switches in series with the load, the load being shown as the combination of a resistor and a choke coil. One of the switches is shunted by a series combination of a resistor and a capacitor and also by a "bleeder" resistance for the capacitor. To interrupt the energizing circuit to the load, the one switch is opened, forcing the entire circuit into oscillation due to the presence of the choke coil in series with the capacitor that is connected across the first switch. This oscillation is of a free but damped nature and, therefore of a progressively declining amplitude. Therefore, when the second switch is opened, the current in the circuit is an oscillatory current which may be of considerably reduced amplitude and passes through zero twice in every cycle, and hence is easier to interrupt than a D.C. current of like potential. Oscillation is highly essential to the proper functioning of the Lee arrangement; conversely, it is highly undesirable in the applications to which the present invention is directed.

SUMMARY OF THE INVENTION

It is a principal object of the present invention, therefore, to provide a new and improved circuit interrupter for the power supply circuit of an inductive D.C. load that effectively limits the voltages induced in the circuit, upon interruption, to a tolerable level and thus limits the electrical stresses within the load windings and associated equipment and facilitates switching of the load current without excessive and destructive arcing at the interrupter switch, yet does not present an extended period of oscillation upon circuit interruption.

A further object of the invention is to provide a new and improved circuit interrupter for the energizing circuit of a D.C. inductive load that is not dependent upon such devices as linear and non-linear discharge resistors, diodes, inductively coupled short-circuit windings, or other extraneous rating devices connected to or incorporated in the inductive load itself to limit self-induced voltage to a tolerable level.

A particular object of the invention is to provide a new and improved circuit interrupter for the energizing circuit of an inductive D.C. load that is effective initially to commutate and subsequently to interrupt current flow to the load without sustained arcing at the interrupter switch and with only a minimal degree of sparking.

Another object of the invention is to provide a new and improved arcless circuit interrupter for an inductive D.C. load having a fast release response and permitting optimum speed of operation.

A specific object of the invention is to provide a new and improved circuit interrupter for the energizing circuit of a D.C. inductive load that is simple and inexpensive to manufacture, requiring, essentially, only a pair of switches, a capacitor, and a resistor.

Accordingly, the invention relates to a circuit interrupter for the energizing circuit of an inductive load energized from a D.C. power supply. The circuit interrupter comprises a first switch means and a second switch means, connected in series with each other and in series with the energizing circuit for the load, together with actuating means for actuating the first and second switch means to open condition, in predetermined sequence, with the opening the thpe switches spaced in time by a predetermined switching interval. The interrupter further comprises capacitance storage means connected in parallel with the first switch means and forming, with the inductance of the load, a resonant circuit having a predetermined resonance period of substantially lesser duration than the aforementioned switching interval. A discharge resistance is connected in parallel with the first switch means and with the capacitance storage means. The relative values of the load inductance, the capacitance storage means, and the discharge resistance are correlated to effect substantially simultaneous reductions in the current to the load, in the voltage stored in the capacitance storage means and the self-induced voltage of the load device during the switching interval, to levels providing substantially arcless interruption of the load circuit, without substantial protracted load current oscillation, during the said switching interval.

DESCRIPTION OF THE PREFERRED EMBODIMENTS

Figure 1:
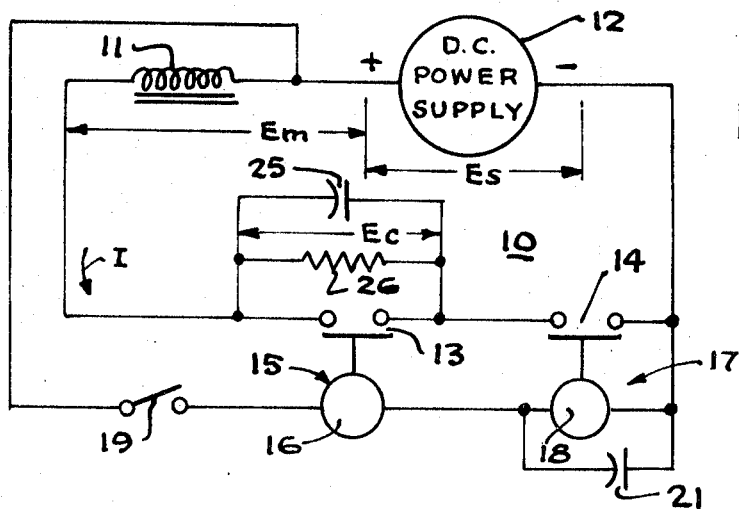
FIG. 1 is a schematic diagram of a circuit interrupter constructed in accordance with a first embodiment of the invention.

FIG. 1 illustrates a circuit interrupter 10 applied to the energizing circuit of an inductive load represented by a coil 11, connected to a D.C. power supply 12. The inductive load 11 may, for example, comprise a large contactor, a brake magnet, a magnetic clutch, or other similar electromagnetic device. It may also be properly and effectively applied to such non-mechanical inductive loads as motor and generator field windings. In the ensuing description, it is assumed that inductive load 11 is not provided with built-in inhibiting devices such as partially short-circuited energizing windings, and that the magnetic circuit of the inductive load is compatible with operation on commerical A.C. power to the extent that eddy currents, which tend to retard the collapse of a magnetic field, are minimized so that the device is adapted to high speed operation. It should be understood that operation of circuit interrupter 10 is not dependent upon an inductive load 11 having these particular characteristics; however, a relatively flexible inductive load device of this kind best demonstrates the operational characteristics of the invention. The response of circuit interrupter 10, with other kinds of load, is similar in nature and sequence but may be subdued in amplitude because of inherent or contrived inhibiting influences.

The D.C. power supply 12 may comprise a battery or a conventional D.C. generator. For the circuit illustrated in FIG. 1, the D.C. power supply 12 is preferably not a rectifier power supply, for reasons set forth below.

The energizing circuit connecting power supply 12 to inductive load 11 includes, in series, a first switch means 13 and a second switch means 14. The first switch means 13 comprises a pair of normally open contacts of an electromagnetic relay 15 having an operating coil 16, whereas the second switch means 14 comprises the normally open contacts of a relay 17 having an operating coil 18. The relay coils 16 and 18 are connected in series with each other and in series with a pilot switch 19 in a relay operating circuit that is connected to an appropriate power supply. In FIG. 1, the power supply for relays 15 and 17 is assumed to be the same D.C. power supply 12 that is used for the inductive load 11 although this need not be the case. A capacitor 21 is connected in parallel with the operating coil 18 of the second switching relay 17 to afford a time delay in the operational characteristic of the second switch 14.

It is not essential to the operation of circuiit interrupter 10 that switches 13 and 14 be incorporated in separate electromagnetic relays; indeed, a single actuating means for both the switches can be provided as described hereinafter in connection with FIG. 4. However, it is necessary, for effective operation of circuit interrupter 10, that switches 13 and 14 be provided with some actuating means for opening the two switches in predetermined sequence, first switch 13 and then switch 14, with the opening of the two switches being spaced in time by a predetermined switching interval.

A capacitance storage means, shown as a single capacitor 25 in the embodiment of FIG. 1, is connected in parallel with the first circuit interrupter switch 13. The electrical dimensions of the capacitance 25 are critical to effective operation of the invention, as discussed hereinafter. A damping resistance 26 is connected in parallel with the first switch means 13 and with the capacitance storage means comprising capacitor 25. The prime purpose of the damping resistance 26 is to discharge capacitance 25 in a predeterminped sequence. Generally speaking, resistance 26 may be of the order of 10 to 50 times the ohmic resistance of load 11, depending upon the operating voltage of power supply 12 and other factors in the circuit, as discussed more fully below.

As noted above, selection of the capacitor 25 as to capacitance and working voltage is critiical to the present invention. In essence, the capacitor is selected to establish a resonance period for load device e 11 and capacitor 25 which is at least as long as the time interval during which the energy stored in the magnetic field of load device 11 can be discharged without generating self-induction voltages exceeding safe and tolerable levels for the load device. In accordance with the present invention, the transfer of energy through the inductance of load device 11 to capacitor 25 is achieved during a first positive quarter cycle of the resonance frequency of capacitor 25 and inductive load 11.

As a concrete example, it may be assumed that the construction of device 11 is such that the energy stored in its magnetic field may be substantially completely discharged during a time interval of 25 milliseconds without generating self-induction voltages exceeding the safety limits for the windings of device 11. Under these circumstances, capacitor 25 may be selected to resonate with the inductance at device 11 at a frequency of 10 cycles per second, affording a resonance period of 100 milli-seconds, and, consequently, a quarter-cycle period of 25 milliseconds. The resonance frequency for the circuit is determined in accordance with the equation:

$$f = 1/(2\pi \sqrt{LC})$$

in which
 $f$ = resonance frequency
 $L$ = inductance of device 11
 $C$ = capacitance of capacitor 25.

It is seen that the frequency $f$ is inversely related to the capacitance $C$. The voltage of induction, whether self-induction or mutual induction, is directly related to the frequency $f$. Accordingly, the greater the size of the capacitor 25, the lower the voltage of self-induction generated in the windings of load device 11.

The relevance of the resonance frequency $f$ for the inductance $L$ of load device 11 and the capacitance $C$ of capacitor 25 to the operational features of the present invention may be understood from a consideration of the elementary A.C. dynamics of the circuit. If the inductance $L$ and capacitance $C$ afford a natural frequency of 10 cycles per second, as assumed, and the circuit is subjected to an A.C. voltage of like frequency, a sustained oscillation at ten hertz will be maintained in the circuit by virtue of the A.C. driving voltage. Under these conditions, the energy stored in the magnetic field of load device 11 will be transferred to the electrostatic field of capacitor 25 ten times in each second; moreover, the energy will also be re-transferred to the magnetic field of device 11 ten times in each second. Thus, during a single cycle of 100 milliseconds, the reactive component of the circuit energy may be said to reside for 50 milliseconds in the magnetic field of device 11 and for 50 milliseconds in the electrostatic field of capacitor 25, with the interchange of energy following the dynamics of a sine wave. Because the reactive voltages of the inductive device 11 and the capacitor 25 are substantially equal and diametrically opposed, they effectively cancel each other out, so that the A.C. voltage acts only on the ohmic resistance in the circuit, including chiefly the resistance of the windings in load device 11. Thus, the current through the windings of device 11, for the assumed state of resonance, is substantially the same amplitude as it would be for a D.C. voltage corresponding to the amplitude of the A.C. voltage. That is, the only factor tending to limit current flow in the circuit is the resistance in the circuit; this condition prevails as long as resonance exists.

The reactance voltages across load device 11 and across capacitor 25 are a product of the current flowing in the circuit multiplied by the reactance of the two devices. Because load device 11 is essentially a D.C. device, it will normally include windings having many more turns than a strictly A.C. device of like voltage rating. As a consequence, the reactance voltage (self-induced voltage) across device 11, at the resonance frequency, may be many times the normal operating voltage. Proper selection of capacitor 25 is necessary to limit this self-induced voltage of load device 11 to a tolerable level. Since, in the prescribed mode of operation of the present invention, the reactive voltage of capacitor 25 may exceed the reactive voltage of the device 11 by a margin corresponding to the operating voltage $E_s$, it follows that the determination of a compatible resonance frequency must take account of the working voltage limits of capacitor 25 as well as the voltage limits for the self-induced voltage of device 11.

Operation of the controller 10, FIG. 1, is initiated by closing pilot switch 19. When switch 19 is closed, the coil 16 is energized, actuating relay 15 and closing the first switching means comprising relay contacts 13. The closing of contacts 13 effectively shunts capacitor 25 and resistor 26. Subsequently, after a time interval determined by the capacitor 21 and its charging characteristics, coil 18 is energized and actuates relay 17. This closes the second switch means 14 and establishes a simple series circuit comprising the power supply 12, load device 11, and the two serially connected switch means 13 and 14. Load device 11 is thus energized, the voltage drop $E_m$ across the device being essentially equal to the power supply voltage $E_s$, with a steady D.C. current $I$ (FIG. 2).

Figure 2:
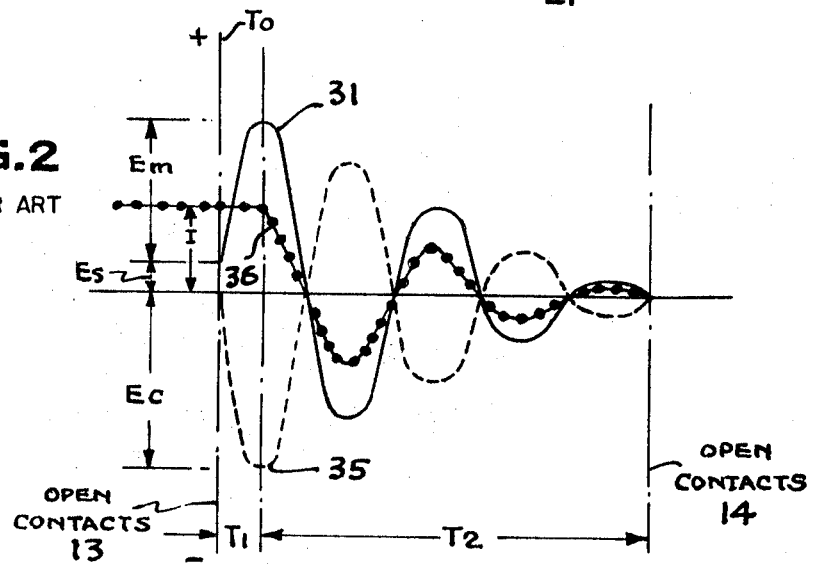
FIG. 2 is a graphic representation of an elementary or prior art mode of operation.

To aid in understanding the operation of circuit interrupter 10, it may first be assumed that resistor 26 is omitted entirely (infinite resistance) or is of an extremely high resistance; under these circumstances, the circuit interrupter functions in the manner graphically illustrated in FIG. 2. To initiate de-energization of load device 11, pilot switch 19 is opened, de-energizing coil 16 of relay 15 and opening the first switching means comprising the relay contacts 13. The D.C. supply to coil 18 is also interrupted but the energy stored in capacitor 21 prevents relay 17 from dropping out immediately.

Upon opening of the first switch means 13, capacitor 25 is effectively connected in the operating circuit for load device 11. Under the impetus of the supply voltage $E_s$, the circuit is triggered into oscillation at the resonance frequency determined by the inductance of device 11 and the capacitance of capacitor 25. This action is illustrated in FIG. 2 at the beginning of the time interval T1. Because of the basic 90° displacement between capacitive and resistive current flow, the presence of the shunting resistor 26, of whatever value, does not immediately or materially affect the charging current to capacitor 25 which current is maintained at substantially the level I in the course of the quarter-cycle interval T1.

In FIG. 2, the combined voltage across load device 11 and power supply 12 is indicated by solid line curve 31 and the voltage across capacitor 25 is illustrated by dash line 35. In the first quarter cycle of oscillation, a substantially like level of the energy stored in the magnetic field of device 11 is, in effect, transferred into the electrostatic field of capacitor 25. Because the transfer occurs under the impetus of the voltage $E_s$ of power supply 12, capacitor 25 is subjected to a surge of voltage equal to the sum of the power supply voltage $E_s$ and the reactance voltage $E_m$ of load device 11. In this respect, operation of circuit interrupter 10, in interrupting a D.C. current, differs from the mode of operation for A.C. resonance described above. Thus, the initial maximum surge voltage $E_c$ (FIG. 2) on capacitor 25 consitutes one limiting factor in determining a compatible maximum resonance frequency of operation.

The cumulatively combined supply voltage Es and induced voltage Em are in direct opposition to the reactance voltage Ec of capacitor 25. Consequently, the two voltages (Es + Em) and Ec mutually neutralize each other with the result that the flow of load current, indicated by curve 36 in FIG. 2, remains substantially unaltered for a period equal to a quarter cycle at the resonance frequency, the period T1 in FIG. 2. Thus, the contacts of switch 13 open under substantially zero voltage stress; there is no tendency toward ionization of the air between the contacts 13 as they open.

For a resonance frequency of 10 hz, the normal full load current I will continue to flow for an initial time interval T1 of approximately 25 milliseconds beyond the parting of the contacts of switch 13 at time To. Instantly subsequent to the quarter cycle time interval T1, and due to lack of a reverse driving voltage such as would normally be present in A.C. operation of a resonant circuit, the balance of the oscillation becomes of a free nature and is damped out after several cycles by the overall resistance of the circuit. In this prior art mode of operation, the switch means 14 may be operable to open in the course of the T2 interval of damped oscillation at reduced voltage and current amplitudes to effect interruption of current flow at the zero-current instant of the alternating cycle.

The mode of operation described above, with a random selected, high value resistor 26, is highly undesirable in many applications. The presence of the oscillating load current 36 produces incompatible operating sequences for D.C. load device 11. Thus, if the mechanical element of load device 11 comprises the armature of a contactor or the plunger of a solenoid magnet, the oscillating current 36 produces a clattering of the armature or plunger against the seating surface of the magnet frame and may preclude release of the armature until the major portion of the oscillation has been dissipated, meanwhile making excessive noise. Furthermore, this mode of operation, as applied to substantially responsive generator and motor field windings, results in injection of an A.C. component into the armature voltage or counter-voltage, respectively, on opening of the first switching means 13, which may produce highly undesirable effects.

In accordance with the present invention, however, resistor 26 is selected and applied to prevent the free oscillation of the load current 36 subsequent to time interval T1 by precluding the return of substantial energy from capacitor 25 to load device 11. In this respect, it should be noted that during the intervals T1 and T2, with switch 13 open and switch 14 closed, resistor 26 is common to both the parallel RC circuit comprising capacitor 25 and resistor 26 and the parallel RL circuit comprising power supply 12, load device 11, and resistor 26. The value of resistor 26 can be selected to afford a rate of voltage decline, and thus energy discharge, from capacitor 25 that conincides with or potentially exceeds the rate of reactive voltage decline in, and thus energy discharge from, load device 11 during time interval T2. With resistor 26 selected to this end, the load current declines substantially in the manner illustrated by the curve 37 in FIG. 3 and does not reach zero until point 39A at the end of time interval T2. This affords performance of the kind illustrated in FIG. 3, in which the voltage across capacitor 25 is represented by dash line curve 38 and the voltage across power supply 12 and load device 11 corresponds to the solid line curve 39. With this optimum value for resistance 26, the decline of load current coincides substantially with the simultaneous decline of the voltages across load device 11 and capacitor 25. Consequently, no periodic interchange of current occurs between capacitance 25 and load device 11, the circuit cannot oscillate, and the load current declines in accordance with curve 37.

If the damping resistance 26 is increased above the optimum value, the decline of the voltage across capacitance 25 is retarded and the decline of the voltage across the inductive load is accelerated, with the result that the voltage on the inductive side of the circuit is smaller than the capacitive voltage and the capacitance 25 feeds energy back to load device 11, initiating load current fluctuation at an amplitude proportional to the instantaneous difference between the two voltages. With a minimal increase of resistance 26, the declining load current represented by curve 37 in FIG. 3 acquires a mild ripple at the resonance frequency determined by inductance L and capacitance C. Continued progressive increase in resistor 26 up to the infinite value represented by a complete removal of the resistor results in a return to the maximum oscillation of the load current shown in FIG. 2. On the other hand, decreasing the resistance of resistor 26 below the optimum level accelerates the decline of the voltage across capacitor 25 and retards the decline of the voltage across the inductive load 11. This affords positive protection against the voltage on the capacitor exceeding that on the inductive load and thus assures the elimination of oscillation.

In order to afford a more concrete illustration of a specific application of the invention, typical values of peak voltages occuring in the circuit during the interval T1 for given capacitor sizes, assuming an inductive load device 11 having an inductance of 2.35 Henrys, are set forth in Table I and Table II below. Table I affords values for different resonant frequencies in a circuit in which resistor 26 is omitted, or is of extremely high value so that the load current is susceptible to oscillation according to FIG. 2. Table II affords corresponding values for a similar circuit that includes a resistor 26 of an appropriate size, in each instance, to suppress oscillation of the load current subsequent to the first quarter-cycle in the manner shown in FIG. 3. To avoid destructively excessive test voltages for these compilations particularly with respect to Table I, device 11 and power supply 12 were dimensioned to the 25 volt level of the 25–300 volt range to which this invention may be deemed most practically applicable.

TABLE I

Resistance 26 Infinite

| Capacitor 25 (mfd) | Self-Induced Voltage | Commutating Voltage Ec | T1 m. sec. | Resonance frequency f |
|---|---|---|---|---|
| 3 | 1225 | 1250 | 4.15 | 60 |
| 5 | 1025 | 1050 | 5.4 | 45 |
| 10 | 715 | 740 | 7.6 | 33 |
| 12 | 615 | 640 | 8.3 | 30 |
| 20 | 515 | 540 | 10.6 | 22 |
| 40 | 365 | 390 | 15.1 | 16.5 |
| 80 | 255 | 280 | 21.5 | 11.3 |
| 160 | 175 | 200 | 30 | 8.2 |
| 640 | 70 | 95 | 60 | 4.1 |

TABLE II

| Capacitor 25 (mfd) | Resistor 26 (ohms) | Induced Voltage | Comm. Voltage | T1 T2 msec | Resonance f |
|---|---|---|---|---|---|

|     |     | Em  | Ec  |      |     |      |
| --- | --- | --- | --- | ---- | --- | ---- |
| 3   | 580 | 575 | 600 | 4.15 | 20  | 60   |
| 5   | 460 | 465 | 490 | 5.4  | 25  | 45   |
| 10  | 340 | 325 | 350 | 7.6  | 35  | 33   |
| 12  | 310 | 295 | 320 | 8.3  | 39  | 30   |
| 20  | 255 | 215 | 240 | 10.6 | 45  | 22   |
| 40  | 200 | 145 | 170 | 15.1 | 59  | 16.5 |
| 80  | 150 | 102 | 127 | 21.5 | 78  | 11.3 |
| 160 | 120 | 73  | 98  | 30   | 98  | 8.2  |
| 640 | 80  | 34  | 58  | 60   | 147 | 4.1  |

From the standpoint of practical operation of the invention, however, it is not essential to achieve an ideal optimum size for resistor 26 so long as that resistor is made small enough to preclude substantial oscillation. Furthermore, it is not essential to time the operation of the second switching means 14 to occur exactly at point 39 at the end of time interval T2. Instead, the second switching means 14 can remain closed until after the current has stabilized at a reduced level as determined by the total resistance of the circuit including the resistance of load device 11 and that of resistor 26. Generally speaking, the resistance 26 may be 10 to 50 times the resistance of load device 11, depending upon the operating voltage and related factors in the main power circuit, being made sufficient to assure a stabilized load current, subsequent to time T2, that is of negligible value comparable to the full load current I in normal operation.

Upon stabilization of the current, the voltage across capacitor 25 is equal to the voltage drop across resistance 26. Accordingly, when the second switching means 14 is opened, capacitor 25 begins to discharge through resistor 26 and develops a voltage across the damping resistance that is in opposition to the generator voltage. Consequently, the contacts of switching means 14 may be subject to a voltage stress corresponding to the differential between the supply voltage and the voltage drop across damping resistance 26, a differential that may be less than 10 percent of the normal operating voltage. In general, switch contacts which will interrupt a given resistive ampere load at a 60 hz A.C. voltage of the industrially standard value of 250 volts will also interrupt a like resistive ampere load at a D.C. voltage equal to about ten percent of the A.C. voltage without need for arc suppression and with acceptable contact life. Upon final interruption of current in the circuit of interrupter 10, the second switching means 14 functions within these limits.

In applications requiring more rapid release of the armature member of a load device, the switching interval T1+T2 (FIG. 3) required for the operation of load interrupter 10 may be excessive. A load interrupter circuit 40 constructed in accordance with another embodiment of the invention and permitting more rapid release response in some applications is illustrated in FIG. 4; the operation of circuit 40 is explained in connection with FIGS. 5 and 6.

Figure 4:
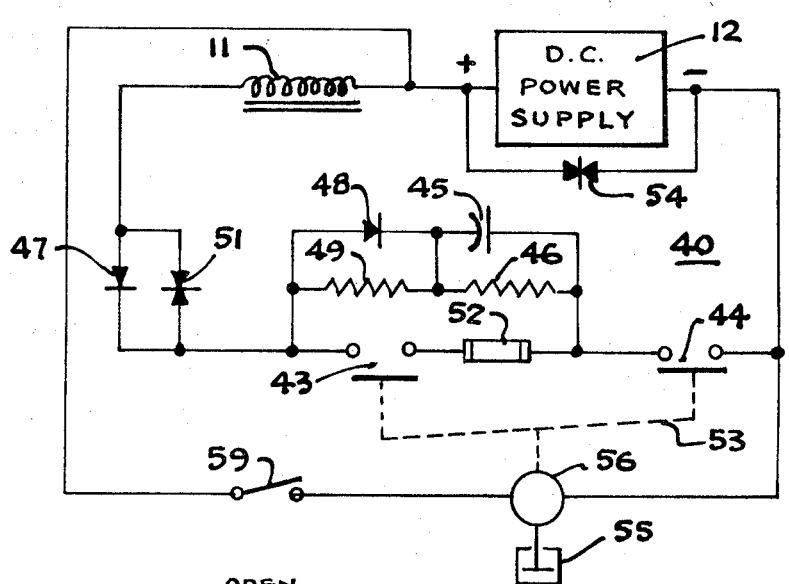
FIG. 4 is a schematic diagram of a circuit interrupter constructed in accordance with another embodiment of the present invention.

Interrupter circuit 40, as shown in FIG. 4, comprises an inductive load device 11 connected to a D.C. power supply 12 by an energizing circuit that includes, in series, a first switch means 43 and a second switch means 44. A capacitive storage means, shown as a single capacitor 45, is connected across the first switch means 43. A damping resistor 46 is connected in parallel with capacitor 45 and switch 43. In the preferred construction illustrated in FIG. 4, a diode 48 is connected in series with the parallel RC circuit comprising capacitor 45 and resistor 46, and an additional resistor 49 is connected in parallel with diode 48.

In circuit interrupter 40, a unidirectionally conductive device, shown as a diode 47, is connected in series in the energizing circuit for load device 11. A voltage suppressor 51, such as a back-to-back selenium rectifier, may be connected in parallel with diode 47 in some instances as explained more fully hereinafter. In the preferred circuit illustrated in FIG. 4, a fuse 52 is connected between the first switch means 43 and the second switch means 44, in that part of the circuit bridged by the arc suppression circuit comprising capacitor 45.

In the embodiment of FIG. 4, the contacts of the first switch means 43 and the second switch means 44 are mounted upon a single mechanical carrier 53 actuated by a contactor magnet 56. Contacts 43 and 44 are structurally offset to provide a basic time interval between their operation. That switching interval is made adjustable by means of a retarding device 55 connected to the armature of magnet 56; device 55 may comprise a conventional pneumatic dashpot of the bellows type. A pneumatic device of this kind may be programmed to provide retardation only upon opening of contacts 43 and 44, and may impose little delay on the closing of the contacts. Magnet 56 is energized from power supply 12 through a pilot switch 59. A separate power supply may be used for the magnet 56 if desired.

Figure 5:
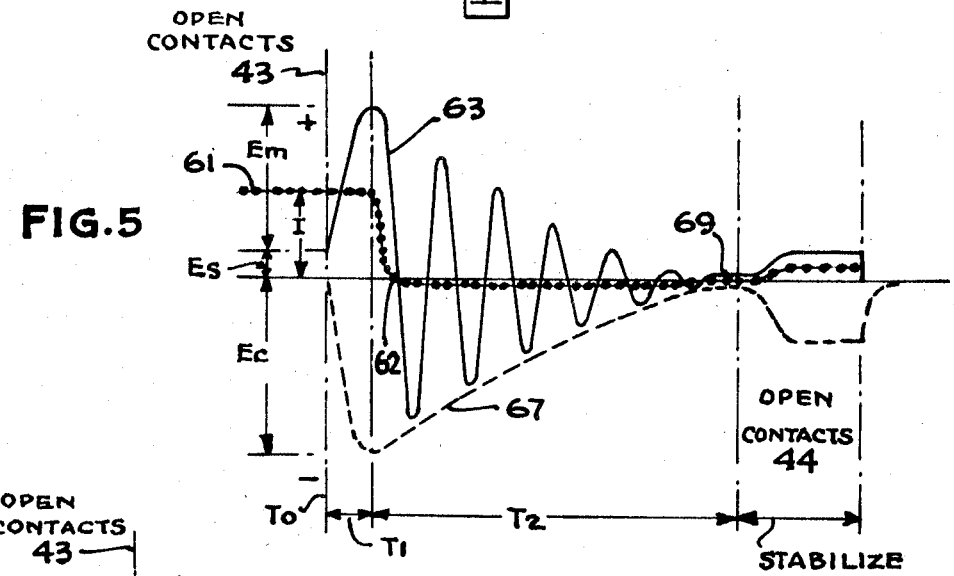
FIGS. 5 and 6 are graphic representations of operation of the circuit interrupter for FIG. 4 for two circuit component variations.
Figure 6:
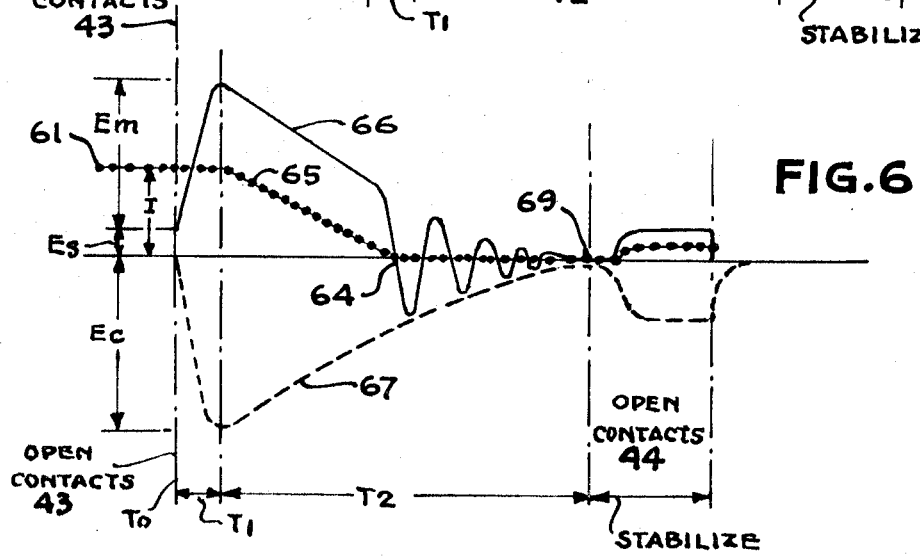

The effect of the modifications in circuit interrupter 40 on the circuit operation are illustrated in FIGS. 5 and 6. Diode 47 renders the overall energizing circuit for load device 11 unidirectionally conductive, so that the return of energy from storage capacitor 45 back to load device 11 that would normally occur during each negative half-cycle in a bi-directionally conductive circuit is effectively prevented. As a consequence, the clatter-causing current oscillation described above is arrested at the instant of decline of the load current, represented by curve 61 in FIG. 5, to zero value. Assuming a large or even infinite resistance 46, the load current declines quite abruptly and reaches zero shortly after the first quarter cycle at the resonant frequency, as clearly shown in FIG. 5 at point 62. Thus, incorporation of the unidirectionally conductive device 47 in interrupter circuit 40 makes it possible to effect a faster release response for a given value of the storage capacitor 45 and a higher-than optimum value of discharge resistance 46.

However, the abrupt decline of load current from the initial level I to zero at point 62 is instantly followed by oscillation of the load device voltage illustrated by curve 63 in FIG. 5; curve 67 shows the capacitor voltage which is non-oscillatory and declines according to the RC time property of the capacitor 45 and resistor 46. Thus, oscillation, generally illustrated by curve 63, occurs at a frequency corresponding to the resonance frequency of the inductance of load device 11 and the inherent distributed capacitance of the windings in that device, and reduces to zero at point 69, the end of time interval T2. Although the oscillation may be of such high frequency and low effective energy level as not to interfere with the desired functioning of load device 11, the peak amplitude of the voltage across diode 47 may reach the same level as the instantaneous value of the reactance voltage Ec occurring at the instant of current decline to zero. Consequently, the peak inverse voltage rating of diode 47 should be greater than the peak value Ec of the capacitor reactance voltage. Moreover, it will be recognized that if power supply 12 is a rectifier power supply, the rectifier elements would function in the same manner as diode 47 and would be subjected to the electrical stress of the aforementioned oscillation illustrated by curve 63, pointing up the need for a rectifier having a peak inverse voltage rating greater than the peak value Ec of the capacitor reactance voltage.

Like the clatter-causing oscillation of the load current illustrated in FIG. 2, the high-frequency voltage oscillation represented by curve 63 in FIG. 5 can be reduced in initial amplitude by reducing resistor 46 to cause the oscillation to occur at a later point as shown in FIG. 6. The effect on the load current and the inductive voltage are illustrated by curves 65 and 66, respectively, in FIG. 6. With this adjustment, the amplitude of the oscillation of the inductive reactance voltage may be held below a practical peak inverse voltage level for diode 47 or for a rectifier power supply, should one be involved. As shown by FIG. 6, however, such an adjustment results in a substantially later decline of current 65 to the zero level at point 64 and a correspondingly later release of the armature lf load device 11. Of course, the reduction of oscillation effected through selection of resistor 46 can be carried to the point at which all oscillation is eliminated entirely, but this is comparable to the similar effect discussed above in relation to circuit interrupter 10 (FIG. 1), and negates any release acceleration effect achieved by the presence of diode 47 or a rectifier power supply.

The voltage suppressor 51 permits operation at peak reactance voltages higher than the operating limit for diode 47. It is found that a momentary bypass of reverse current around diode 47 does not appreciably interfere with the clean release of the armature member of load device 11, but rather initially accelerates decline of the load current to the zero level. Of course, if power supply 12 is a rectifier, a suitably dimensioned protective means 54 should be connected in parallel with the power supply.

The operating mechanism for the switch means 43 and 44, as shown in FIG. 4, is readily adjustable to assure initial opening of switch 43, and subsequent opening of switch 44 after a time interval sufficient to reduce the load current approximately to zero or to a low stable level. However, with this particular arrangement, switch 44 may close before switch 43. Under these circumstances, capacitor 45 may acquire a substantial charge, depending upon the circuit constants and the duration of the time interval between closing of the two switch means. The closing of switch 43 short-circuits and discharges capacitor 45 and, unless some protection is provided, may result in a current discharge sufficient to cause contacts 43 to erode or even to stick, thereby interferring with effective circuit interruption at a subsequent time.

Diode 48 and resistor 49 are employed to counteract this effect and to provide for other difficult operating conditions such as rapid jogging of a portative or tractive load device 11 or momentary pulsing energization of a motor or generator field winding. Diode 48 and resistor 49 afford a network which permits immediate charging of capacitor 45, but limits the rate of discharge of the capacitor to a level that is tolerable in relation to the operation of contacts 43, and thus precludes sticking or erosion of the contacts.

It is generally regarded as poor practice to insert a fusible overload device into the energizing circuit for a DC inductive load, such as a separately energized field winding for a motor or generator or other such device of substantial power requirements. A rupture of the fuse in such a case generally results in destruction of the fuse structure by a sustained inductive arc therein, and the possibility of generation of excessive self-induced voltages in the windings of the load device upon subsequent extinction of the arc. Fuse 52 in interrupter circuit 40, however, avoids this hazard. Fuse 52 should be a fast-acting fuse of the type often used for short circuit protection of rectifier power supplies. When incorporated in the circuit in the position shown in FIG. 4, the fuse rupture is acted upon by the arc suppression circuit comprising capacitor 45 and resistor 46. Consequently, the rupture of fuse 52 is equivalent to opening of the first switch means 43, with the result that the load current is arclessly commutated to a low stable level without creation of excessive transients.

The following data are set forth, as an example of a practical application of the invention, solely by way of illustration and in no sense as a limitation on the invention.

| | |
|---|---|
| Load device 11 | Field winding of 150 HP planer motor, 250v D.C., 35 ohms resistance, 4.7 H maximum inductance, full strength energizing current approximately 7 amperes |
| Switch means 43,44 | Contacts rated 20 amperes for resistive load at 60 hz 240 volts, without arc quenching means |
| Capacitor 45 | Two electrolytic capacitors rated 500 microfarads, 450 volts, 525 volts surge, connected in series. |
| Resistor 46 | 1200 ohms, 100 watts (dimensioned to suppress approx. 4.5 Hz oscillation during interval T2) |
| Diode 48 | 10 amperes, 1 kilovolt |
| Resistor 49 | 50 ohms, 25 watts |
| Fuse 52 | 8 ampere, 250 volt recitfier type |
| Es | 250 volts D.C. (constant) |
| Em | approximately 650 volts peak |
| Ec | approximately 900 volts peak |

Figure 3:
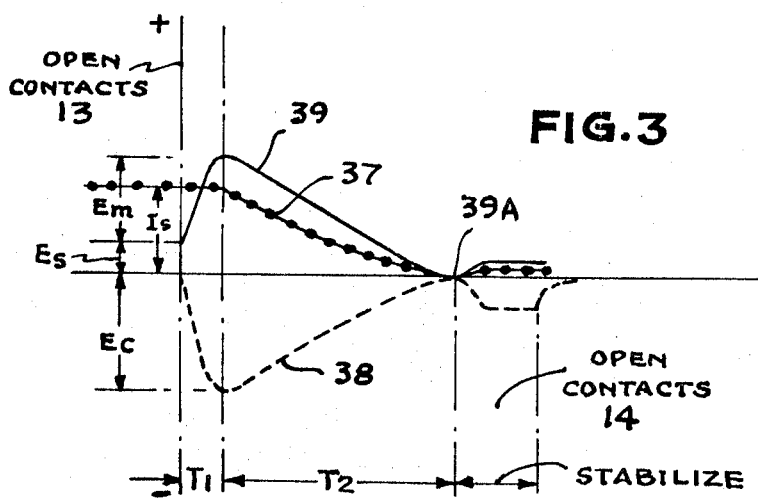
FIG. 3 is a graphic representation of the mode of operation for the circuit of FIG. 1 achieved by the invention.

The assembly and adjustment of the components is directed to a non-oscillating interruption of energizing current to the field winding, according to FIG. 3.

I claim:

1. A non-oscillating, arcless interruptive control arrangement for an electric circuit comprising a direct-current power supply serving an inductive load:

said interruptive control arrangement comprising a capacitance connected into the circuit in series relation with the said inductive load, a first closed switch means connected, in shunt relation, to the said capacitance and in series relation with the said inductive load, a second closed switch means connected serially between the said first closed switch means and the said direct-current power supply, a first resistance means connected, in shunt relation, to the said capacitance and the said first closed switch means;

said first closed switch means operable to open and insert into the circuit capacitive reactance of the said capacitance to counter-act the inductive reactance of the inductive load to effect an interval of substantially zero-impedance and therefore substantially zero voltage-drop across the contacts of the said first switch means and to insert the said first resistance means into the circuit;

the said first resistance means being dimensioned to provide that the inherent RC time character of the said capacitance and the said first resistance means is at least minimally lesser than the inherent L/R time character of the said inductive load and the said first resistance means to thus provide that the capacitance may not return energy to the inductive load subsequent to the initial voltage charge to the said capacitance;

said second closed switch means operable to open, subject to suitable delay means and predetermined time interval, to interrupt the circuit subsequent to substantially complete and simultaneous discharge of the stored energy of the said capacitance and the said inductive load and upon reduction and stabilization of the load current to level prescribed by the said first resistance means.

2. In a non-oscillating, arcless interruptive control arrangement according to claim 1, further providing an over-current protective device connected between the said first closed switch means and a common junction of the said capacitance, the said first resistance means and the said second closed switch means.

3. In a non-oscillating, arcless interruptive control arrangement according to claim 1, further providing an over-current protective device connected between the said first closed switch means and a common junction of the said capacitance, the said first resistance means and the said inductive load.

4. In a non-oscillating, arcless interruptive control arrangement according to claim 1, further providing a parallel combination of a second resistance means and a uni-directionally conductive device, said combination connected between a common junction of the said capacitance and said first resistance means and the common junction of the said first closed switch means and the said inductive load, said uni-directionally conductive device forward-biased in the direction of normal load-current flow.

5. In a non-oscillating, arcless interruptive control arrangement according to claim 1, further providing a parallel combination of a second resistance means and a uni-directionally conductive device, said combination connected between a common junction of the said capacitance and said first resistance means, and the said second closed switch mans, sai uni-directionally conductive device forward-biased in the direction of normal load-current flow.

6. A non-oscillating arcless interruptive control arrangement for an electric circuit comprising a direct-current power supply serving an inductive load:

said interruptive control arrangement comprising a uni-directionally conductive device connected into the circuit in series relation with the said inductive load and forward-biased in the direction of normal load-current flow, a capacitance connected into the circuit in series relation with the said uni-directionally conductive device and the said inductive load, a first closed switch means, connected, in shunt relation, to the said capacitance, a second closed switch means connected serially between the said first closed switch means and the direct-current power supply, a resistance means connected, in shunt relation, to the said capacitance and the said first closed switch means;

said first closed switch means operable to open and insert into the circuit capacitive reactance of the said capacitance to counter-act the inductive reactance of the said inductive load to effect an interval of substantially zero impedance and, therefore, substantially zero-voltage drop across the contacts of the said first switch means and to insert the said resistance means into the circuit, the said resistance means being dimensioned that the initial voltage charge into the said capacitance may not exceed the inverse-voltage limitation of the said uni-directionally conductive device;

said second closed switch means operable to open, subject to suitable delay means and predetermined time interval, to interrupt the circuit subsequent to reduction and stabilization of the load-current thru the said inductive load to level prescribed by the said resistance means.

7. In a non-oscillating, arcless interruptive control arrangement according to claim 6 and further providing that the said uni-directionally conductive device may be comprised of a plurality of rectifier diodes serially connected and provided with compatible inverse-voltage protective means.

* * * * *

UNITED STATES PATENT OFFICE
CERTIFICATE OF CORRECTION

Patent No. 3739192            Dated June 12, 1973

Inventor(s)    Joseph V. Oswald

It is certified that error appears in the above-identified patent and that said Letters Patent are hereby corrected as shown below:

The title should read:

NON-OSCILLATING ARCLESS SWITCHING OF INDUCTIVE D. C. LOADS

Signed and sealed this 27th day of November 1973.

(SEAL)
Attest:

EDWARD M. FLETCHER, JR.       RENE D. TEGTMEYER
Attesting Officer           Acting Commissioner of Patents